US012519652B2

(12) United States Patent
Osborn

(10) Patent No.: US 12,519,652 B2
(45) Date of Patent: Jan. 6, 2026

(54) SYSTEM AND METHOD FOR DYNAMIC INTEGRATION OF USER-PROVIDED DATA WITH ONE-TIME-PASSWORD AUTHENTICATION CRYPTOGRAM

(71) Applicant: Capital One Services, LLC, McLean, VA (US)

(72) Inventor: Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 114 days.

(21) Appl. No.: 18/114,072

(22) Filed: Feb. 24, 2023

(65) Prior Publication Data

US 2024/0291666 A1 Aug. 29, 2024

(51) Int. Cl.
*H04L 9/32* (2006.01)
*H04L 9/08* (2006.01)

(52) U.S. Cl.
CPC .......... *H04L 9/3242* (2013.01); *H04L 9/0825* (2013.01); *H04L 9/3271* (2013.01)

(58) Field of Classification Search
CPC ... H04L 9/0825; H04L 9/3228; H04L 9/3242; H04L 9/3271
See application file for complete search history.

(56) References Cited

U.S. PATENT DOCUMENTS

| | | |
|---|---|---|
| 4,683,553 A | 7/1987 | Mollier |
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

The International Search Report and Written Opinion mailed May 29, 2024, for corresponding PCT/US2024/015945 (19 pages).

(Continued)

*Primary Examiner* — Sharon S Lynch
(74) *Attorney, Agent, or Firm* — KDW Firm PLLC; Andrew D. Kasnevich

(57) ABSTRACT

The disclosed system and method is directed to improving operational security associated with One-Time Password (OTP) authentication card. The proposed solution involves incorporating a user-provided data value, such as a Personal Identification Number (PIN) and/or a password, into the cryptographic process flow for the generation of the Message Authentication Code (MAC) associated with a OTP authentication cryptogram. A key operational aspect corresponds to the scrambling of a unique card-stored data such as a shared secret value, with run-time data externally provided by the user. In this way, the proposed system and method incorporates two factors of identification, associated with card-stored and user-known data elements, into an OTP card authentication cryptogram.

20 Claims, 8 Drawing Sheets

Modified Run-Time Cryptogram READ Command Sequence and Cryptogram Validation Process

(56) References Cited

U.S. PATENT DOCUMENTS

| | | |
|---|---|---|
| 5,533,126 A | 7/1996 | Hazard |
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,853,788 B2 * | 12/2010 | Fascenda ............... H04W 12/06 713/168 |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |

(56) References Cited

U.S. PATENT DOCUMENTS

| | | |
|---|---|---|
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B2 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,634 B2 * | 7/2017 | Fort .................. H04L 63/0838 |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,515,362 B2 * | 12/2019 | Radu .................. G07F 7/088 |
| 10,535,068 B2 | 1/2020 | Locke |
| 10,546,444 B2 | 1/2020 | Osborn |
| 10,581,611 B1 | 3/2020 | Osborn |
| 10,657,754 B1 * | 5/2020 | Osborn ............ G06K 19/07749 |
| 10,664,830 B1 | 5/2020 | Rule |
| 10,685,349 B2 | 6/2020 | Brickell |
| 10,685,350 B2 * | 6/2020 | Osborn ................ G06Q 20/341 |
| 10,797,882 B2 | 10/2020 | Rule |
| 10,839,362 B2 * | 11/2020 | Zheng .................. H04L 63/083 |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,080,961 B2 * | 8/2021 | Osborn ............ G06Q 20/3278 |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |

(56) References Cited

U.S. PATENT DOCUMENTS

| | | | |
|---|---|---|---|
| 11,188,908 B2 | 11/2021 | Locke | |
| 11,216,806 B2 | 1/2022 | Mossler | |
| 11,297,958 B2 | 4/2022 | Vukich | |
| 11,334,872 B2 | 5/2022 | Phillips | |
| 11,336,454 B2 * | 5/2022 | Rule | G06F 21/602 |
| 11,361,173 B2 | 6/2022 | Edwards | |
| 11,392,933 B2 | 7/2022 | Mossler | |
| 11,392,935 B2 | 7/2022 | Suresh | |
| 11,416,844 B1 | 8/2022 | Osterkamp | |
| 11,423,392 B1 | 8/2022 | Ho | |
| 11,443,292 B2 | 9/2022 | Sherif | |
| 11,444,770 B2 | 9/2022 | Wieker | |
| 11,461,764 B2 | 10/2022 | Rule | |
| 11,481,764 B2 | 10/2022 | Shakkarwar | |
| 11,521,213 B2 | 12/2022 | Rule | |
| 11,544,707 B2 * | 1/2023 | Osborn | G06Q 20/108 |
| 11,551,200 B1 | 1/2023 | Cook | |
| 11,556,918 B2 | 1/2023 | Mestre | |
| 11,557,164 B2 * | 1/2023 | Osborn | H04L 63/0853 |
| 11,615,395 B2 | 3/2023 | McHugh | |
| 11,776,348 B2 * | 10/2023 | Osborn | G06K 19/07749 |
| | | | 235/380 |
| 11,777,933 B2 | 10/2023 | Moreton | |
| 11,989,724 B2 * | 5/2024 | Osborn | H04L 9/0877 |
| 12,008,558 B2 * | 6/2024 | Osborn | G06Q 20/204 |
| 12,026,707 B2 * | 7/2024 | Osborn | H04L 9/3234 |
| 12,056,560 B2 * | 8/2024 | Rule | G06Q 20/352 |
| 12,154,105 B2 * | 11/2024 | Osborn | G06Q 20/3829 |
| 2001/0010723 A1 | 8/2001 | Pinkas | |
| 2001/0029485 A1 | 10/2001 | Brody et al. | |
| 2001/0034702 A1 | 10/2001 | Mockett et al. | |
| 2001/0054003 A1 | 12/2001 | Chien et al. | |
| 2002/0078345 A1 | 6/2002 | Sandhu et al. | |
| 2002/0093530 A1 | 7/2002 | Krothapalli et al. | |
| 2002/0100808 A1 | 8/2002 | Norwood et al. | |
| 2002/0120583 A1 | 8/2002 | Keresman, III et al. | |
| 2002/0152116 A1 | 10/2002 | Yan et al. | |
| 2002/0153424 A1 | 10/2002 | Li | |
| 2002/0165827 A1 | 11/2002 | Gien et al. | |
| 2003/0023554 A1 | 1/2003 | Yap et al. | |
| 2003/0034873 A1 | 2/2003 | Chase et al. | |
| 2003/0055727 A1 | 3/2003 | Walker et al. | |
| 2003/0078882 A1 | 4/2003 | Sukeda et al. | |
| 2003/0167350 A1 | 9/2003 | Davis et al. | |
| 2003/0208449 A1 | 11/2003 | Diao | |
| 2003/0220876 A1 | 11/2003 | Burger | |
| 2004/0015958 A1 | 1/2004 | Veil et al. | |
| 2004/0039919 A1 | 2/2004 | Takayama et al. | |
| 2004/0127256 A1 | 7/2004 | Goldthwaite et al. | |
| 2004/0215674 A1 | 10/2004 | Odinak et al. | |
| 2004/0230799 A1 | 11/2004 | Davis | |
| 2005/0044367 A1 | 2/2005 | Gasparini et al. | |
| 2005/0075985 A1 | 4/2005 | Cartmell | |
| 2005/0081038 A1 | 4/2005 | Arditti Modiano et al. | |
| 2005/0138387 A1 | 6/2005 | Lam et al. | |
| 2005/0156026 A1 | 7/2005 | Ghosh et al. | |
| 2005/0160049 A1 | 7/2005 | Lundholm | |
| 2005/0195975 A1 | 9/2005 | Kawakita | |
| 2005/0228997 A1 | 10/2005 | Bicker | |
| 2005/0247797 A1 | 11/2005 | Ramachandran | |
| 2005/0269402 A1 | 12/2005 | Spitzer | |
| 2006/0006230 A1 | 1/2006 | Bear et al. | |
| 2006/0040726 A1 | 2/2006 | Szrek et al. | |
| 2006/0041402 A1 | 2/2006 | Baker | |
| 2006/0044153 A1 | 3/2006 | Dawidowsky | |
| 2006/0047954 A1 | 3/2006 | Sachdeva et al. | |
| 2006/0085848 A1 | 4/2006 | Aissi et al. | |
| 2006/0136334 A1 | 6/2006 | Atkinson et al. | |
| 2006/0173985 A1 | 8/2006 | Moore | |
| 2006/0174331 A1 | 8/2006 | Schuetz | |
| 2006/0242698 A1 | 10/2006 | Inskeep et al. | |
| 2006/0280338 A1 | 12/2006 | Rabb | |
| 2007/0033642 A1 | 2/2007 | Ganesan et al. | |
| 2007/0055630 A1 | 3/2007 | Gauthier et al. | |
| 2007/0061266 A1 | 3/2007 | Moore et al. | |
| 2007/0061487 A1 | 3/2007 | Moore et al. | |
| 2007/0116292 A1 | 5/2007 | Kurita et al. | |
| 2007/0118745 A1 | 5/2007 | Buer | |
| 2007/0197261 A1 | 8/2007 | Humbel | |
| 2007/0224969 A1 | 9/2007 | Rao | |
| 2007/0241182 A1 | 10/2007 | Buer | |
| 2007/0256134 A1 | 11/2007 | Lehtonen et al. | |
| 2007/0258594 A1 | 11/2007 | Sandhu et al. | |
| 2007/0276765 A1 | 11/2007 | Hazel | |
| 2007/0278291 A1 | 12/2007 | Rans et al. | |
| 2008/0008315 A1 | 1/2008 | Fontana et al. | |
| 2008/0011831 A1 | 1/2008 | Bonalle et al. | |
| 2008/0014867 A1 | 1/2008 | Finn | |
| 2008/0035738 A1 | 2/2008 | Mullen | |
| 2008/0071681 A1 | 3/2008 | Khalid | |
| 2008/0072303 A1 | 3/2008 | Syed | |
| 2008/0082452 A1 | 4/2008 | Wankmueller | |
| 2008/0086767 A1 | 4/2008 | Kulkarni et al. | |
| 2008/0099552 A1 | 5/2008 | Grillion | |
| 2008/0103968 A1 | 5/2008 | Bies et al. | |
| 2008/0109309 A1 | 5/2008 | Landau et al. | |
| 2008/0110983 A1 | 5/2008 | Ashfield | |
| 2008/0120711 A1 | 5/2008 | Dispensa | |
| 2008/0156873 A1 | 7/2008 | Wilhelm et al. | |
| 2008/0162312 A1 | 7/2008 | Sklovsky et al. | |
| 2008/0164308 A1 | 7/2008 | Aaron et al. | |
| 2008/0207307 A1 | 8/2008 | Cunningham, II et al. | |
| 2008/0209543 A1 | 8/2008 | Aaron | |
| 2008/0223918 A1 | 9/2008 | Williams et al. | |
| 2008/0285746 A1 | 11/2008 | Landrock et al. | |
| 2008/0308641 A1 | 12/2008 | Finn | |
| 2009/0037275 A1 | 2/2009 | Pollio | |
| 2009/0048026 A1 | 2/2009 | French | |
| 2009/0132417 A1 | 5/2009 | Scipioni et al. | |
| 2009/0143104 A1 | 6/2009 | Loh et al. | |
| 2009/0171682 A1 | 7/2009 | Dixon et al. | |
| 2009/0210308 A1 | 8/2009 | Toomer et al. | |
| 2009/0235339 A1 | 9/2009 | Mennes et al. | |
| 2009/0249077 A1 | 10/2009 | Gargaro et al. | |
| 2009/0282264 A1 | 11/2009 | Amiel et al. | |
| 2010/0023449 A1 | 1/2010 | Skowronek et al. | |
| 2010/0023455 A1 | 1/2010 | Dispensa et al. | |
| 2010/0029202 A1 | 2/2010 | Jolivet et al. | |
| 2010/0033310 A1 | 2/2010 | Narendra et al. | |
| 2010/0036769 A1 | 2/2010 | Winters et al. | |
| 2010/0078471 A1 | 4/2010 | Lin et al. | |
| 2010/0082491 A1 | 4/2010 | Rosenblatt et al. | |
| 2010/0094754 A1 | 4/2010 | Bertran et al. | |
| 2010/0095130 A1 | 4/2010 | Bertran et al. | |
| 2010/0100480 A1 | 4/2010 | Altman et al. | |
| 2010/0114731 A1 | 5/2010 | Kingston et al. | |
| 2010/0192230 A1 | 7/2010 | Steeves et al. | |
| 2010/0207742 A1 | 8/2010 | Buhot et al. | |
| 2010/0211797 A1 | 8/2010 | Westerveld et al. | |
| 2010/0240413 A1 | 9/2010 | He et al. | |
| 2010/0257357 A1 | 10/2010 | McClain | |
| 2010/0312634 A1 | 12/2010 | Cervenka | |
| 2010/0312635 A1 | 12/2010 | Cervenka | |
| 2011/0028160 A1 | 2/2011 | Roeding et al. | |
| 2011/0035604 A1 | 2/2011 | Habraken | |
| 2011/0060631 A1 | 3/2011 | Grossman et al. | |
| 2011/0068170 A1 | 3/2011 | Lehman | |
| 2011/0084132 A1 | 4/2011 | Tofighbakhsh | |
| 2011/0101093 A1 | 5/2011 | Ehrensvard | |
| 2011/0113245 A1 | 5/2011 | Varadrajan | |
| 2011/0125638 A1 | 5/2011 | Davis et al. | |
| 2011/0131415 A1 | 6/2011 | Schneider | |
| 2011/0153437 A1 | 6/2011 | Archer et al. | |
| 2011/0153496 A1 | 6/2011 | Royyuru | |
| 2011/0155801 A1 | 6/2011 | Rowberry | |
| 2011/0208658 A1 | 8/2011 | Makhotin | |
| 2011/0208965 A1 | 8/2011 | Machani | |
| 2011/0211219 A1 | 9/2011 | Bradley | |
| 2011/0218911 A1 | 9/2011 | Spodak | |
| 2011/0238564 A1 | 9/2011 | Lim et al. | |
| 2011/0246780 A1 | 10/2011 | Yeap et al. | |
| 2011/0258452 A1 | 10/2011 | Coulier et al. | |
| 2011/0280406 A1 | 11/2011 | Ma et al. | |
| 2011/0282785 A1 | 11/2011 | Chin | |

(56) References Cited

U.S. PATENT DOCUMENTS

| | | |
|---|---|---|
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0040628 A1* | 2/2014 | Fort .................. H04L 63/18 713/182 |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0298027 A1* | 10/2014 | Roberts .................. G06Q 20/20 713/171 |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0287031 A1* | 10/2015 | Radu .................. G06Q 20/204 705/18 |
| 2015/0302409 A1 | 10/2015 | Malek |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0071081 A1* | 3/2016 | Zheng .................. H04L 9/3247 705/72 |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0295404 A1* | 10/2016 | Gouget .................. H04L 63/0869 |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |

(56) References Cited

U.S. PATENT DOCUMENTS

| | | |
|---|---|---|
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302226 A1* | 10/2018 | Heimlicher ........... H04L 63/061 |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |
| 2020/0104553 A1* | 4/2020 | Rule ....................... G06F 21/35 |
| 2020/0104841 A1* | 4/2020 | Osborn ................. H04L 9/0631 |
| 2020/0244462 A1* | 7/2020 | Rule ....................... H04L 9/0861 |
| 2020/0265427 A1* | 8/2020 | Osborn ............... G06Q 20/3829 |
| 2021/0004806 A1 | 1/2021 | Noe |
| 2021/0192881 A1* | 6/2021 | Osborn ............... G06K 19/0723 |
| 2021/0209606 A1* | 7/2021 | Herlands ............ G06Q 20/4016 |
| 2021/0272098 A1 | 9/2021 | Delsuc |
| 2021/0304189 A1 | 9/2021 | Gupta |
| 2021/0383360 A1 | 12/2021 | Sinha |
| 2021/0390536 A1* | 12/2021 | Osborn ................. H04L 9/0822 |
| 2021/0406869 A1 | 12/2021 | Pathrabe |
| 2022/0012974 A1* | 1/2022 | Osborn ................. G06Q 20/352 |
| 2022/0058642 A1* | 2/2022 | Osborn ............... G06Q 20/3829 |
| 2022/0114581 A1 | 4/2022 | Upadhye |
| 2022/0237281 A1* | 7/2022 | Best ..................... G06F 12/1458 |
| 2022/0284178 A1* | 9/2022 | Rule ....................... G06F 21/35 |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0407724 A1* | 12/2022 | Osborn ..................... H04L 9/30 |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0135815 A1* | 5/2023 | Osborn ............... G06Q 20/3823 235/380 |
| 2023/0169505 A1 | 6/2023 | Rule |
| 2023/0306210 A1* | 9/2023 | Rule ....................... G06F 21/44 |
| 2023/0354020 A1 | 11/2023 | Rule |
| 2023/0359839 A1 | 11/2023 | Lovgren |
| 2024/0087394 A1* | 3/2024 | Osborn ................. H04L 63/067 |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| KR | 20150140132 A | 12/2015 |
| WO | 9910824 A1 | 3/1999 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | 2017047855 A1 | 3/2017 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved

(56) References Cited

OTHER PUBLICATIONS from Internet URL: https://www.authorize.net/our-features/account-updater/, 5 pages.
Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay," Apple Support [online] 2019 [retrieved on Mar. 25, 2019-]. Retrieved from Internet URL: https://support.apple.com/en-us/HT205583, 5 pages.
Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on 2019 -03-25]. Retrieved from Internet URL: https://www.emvco.com/wp- content/uploads/2017/05/EMV_v4.3_Book_2_Security_and_Key_Management_20120607061923900.pdf, 174 pages.
Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.l, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD ?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE Africon At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera Slam", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author unknown: "onetappaymentTM", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, MOBICOM. 10.1145/2348543.2348569.
EMVCo, EMV Card Personalization Specification, version 1.0 (Jun. 2003), 81 pages.
Ullmann et al., (2012). "On-Card" User Authentication for Contactless Smart Cards based on Gesture Recognition, LNI, 223-234, 12 pages.
Faraj et al. (2008). "Investigation of Java Smart Card Technology for Multi-Task Applications" J. of Al-Anbar University for Pure Science, vol. 2: No. 1: 2008, 11 pages.
Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, heeps://web.archive.org/, 75 pages.

(56) References Cited

OTHER PUBLICATIONS

Berg, G., "Fundamentals of EMV", Smart Card Alliance [online] date unknown [retrieved on Mar. 27, 2019]. Retrieved from Internet URL: https://www.securetechalliance.org/resources/media/scap13_preconference/02.pdf, 37 pages.

Author Unknown, "Global expansion of card tapping mobile OTP for security and convenience is imminent," Jun. 28, 2022, website: https://www.swidch.com/blogs/card-tapping-motp-blog.

Emvco: "EMV Card Personalisation Specification," Aug. 1, 2021, pp. 1-114, Retrieved from the Internet: URL: https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

\* cited by examiner

Modified Run-Time Cryptogram READ Command Sequence and Cryptogram Validation Process

SYSTEM AND METHOD FOR DYNAMIC INTEGRATION OF USER-PROVIDED DATA WITH ONE-TIME-PASSWORD AUTHENTICATION CRYPTOGRAM

FIELD OF THE DISCLOSURE

The present disclosure relates to systems and methods for improving security of encrypted one-time password (OTP) authentication process associated with OTP authentication cards, and more specifically to a system and method for dynamic integration of real-time user-provided data to improve the authentication security associated with OTP card transactions.

BACKGROUND

In electronic communication, validation of a transmission source is a key step in authenticating a transmitted message. This is generally accomplished via an encrypted exchange of data records for securely identifying a source of an incoming electronic transmission, for example, by uniquely associating a specific incoming cryptogram to a particular card. In some cases, data associated with the encryption process may be generated during a card personalization phase and statically stored onto, for example a One Time Password (OTP) authentication card, to facilitate run time generation of an authentication cryptogram that is then transmitted to a verification entity. The verification entity uses the data statically stored on the OTP card and one or more data dynamically generated (and transmitted) by the card at run time, to decrypt and validate an authentication cryptogram. This cryptographic approach involving static and dynamic card-stored encryption data is susceptible to security risks, both in terms of network exposure and data breach of the encryption data, which can provide a hacker with all the data necessary to generate and validate an OTP card cryptogram message.

These and other deficiencies exists. Accordingly, there is a need to improve the security of the OTP authentication process.

SUMMARY OF THE DISCLOSURE

One aspect of the present disclosure is directed to an automated process for improving a security performance of an encrypted authentication process associated with operation of OTP authentication cards. The improved security metric may be achieved by incorporating a user-provided secret data value, such as a user Personal Identification Number (PIN) and/or a password, for cryptographically diversifying (e.g., scrambling) one or more encryption data parameters (e.g., shared secret value) associated with the generation and validation of an OTP authentication cryptogram.

Accordingly some embodiments are directed to a method for improving operational security associated with OTP authentication cards, the method may comprise inserting, by an authentication application, a challenge signing instruction into a first near field communication (NFC) transmittable command as part of a run-time command sequence issued upon initiation of an electronic transaction using the OTP authentication card. The challenge signing instruction may be operative to prompt for a user-provided response value. In some embodiments the command sequence may also include a challenge response in addition to or instead of the prompted user provided response value. The first NFC transmittable message along with the user-inputted Personal Identification Number (PIN), provided for example, in response to the challenge signing user prompt, maybe transmitted to the OTP authentication card (which may correspond to a contactless card with an integrated NFC tag communicatively coupled to a user transceiver device). The PIN may not be stored on the OTP authentication card, but directly used in computation of a MAC used in generation of the OTP authentication cryptogram. The OTP (contactless) authentication card may then generate, by an applet stored thereon, a modified Message Authentication Code (MAC) by combining, using a diversification function, the user-provided response value (e.g., PIN) with a secret data value (e.g., shared secret value) stored onto the OTP card during, for example, during the card embossing phase. The shared secret value and/or a data identifier corresponding to the user-provided response value, may also be separately stored by a corresponding validation process and/or server. The generated modified MAC may then be appended to a data packet.

Upon receiving a second NFC transmittable message, the modified MAC-appended data packet may be encrypted, by an applet on the contactless card, using a second unique session key, to generate a modified authentication cryptogram. The modified authentication cryptogram may then be transmitted to the corresponding validation server and/or process. The validation server and/or process may then proceed with decrypting the cryptogram using previously stored identifier values, such as one or more user-provided response values and/or a system and/or application provided challenge response value. Upon validation of the OTP authentication cryptogram, the validation process may further transmit, a verification message to the user via, for example, the user transceiver device, confirming successful validation of an OTP authentication cryptogram.

In some embodiments of the disclosure, the first near field communication (NFC) transmittable message may correspond to a write instruction for writing a user-provided response value and/or a system provided challenge response onto an OTP authentication card to be used in computation of the modified MAC. Accordingly, the second NFC transmittable message, may correspond to a read instruction for retrieving the OTP authentication cryptogram comprising the modified MAC from the OTP (contactless) authentication card. In some embodiments, the first NFC transmittable message corresponding to a write instruction for inserting a system and/or a user provided data value may be part of a (modified) read command sequence associated with initiation of an OTP card authentication transaction.

Some embodiments of the present disclosure are directed to a system for secure authentication of encrypted data, the system comprising: a computer hardware arrangement comprising a OTP (contactless) card with an integrated near field communication (NFC) tag communicatively coupled with an authentication application running on a transceiver device in communication with a corresponding application running on a verification server. The hardware arrangement being configured to insert, by the authentication application running on the transceiver device, a challenge signing instruction into a first NFC Data Exchange Format (NDEF) transmission to the OTP card, wherein the challenge signing instruction is operative to prompt for a user-provided response value. In some embodiments, the challenge signing instruction may also include a challenge response which is transmitted to the OTP card to be used instead of, or in addition to, the user-provided response value (e.g., a user PIN and/or password). The first NFC transmittable message along with the user-provided response value, may then be transmitted along with the user-provided response value (e.g., inputted via the transceiver device) and/or the system generated challenge response value, to the OTP authentication card. Utilizing the transmitted information comprising a user PIN and/or a challenge response value, an applet stored on the OTP authentication card may generate a modified Message Authentication Code (MAC) by combining, using a diversification function, the user-provided response value and/or the system-provided challenge response value, with a first unique session key stored on the OTP card. In accordance to some embodiments, the first unique session key may correspond to an authentication session key for generating the MAC. The user-provided PIN and/or the challenge response may be used to scramble a unique card-stored parameter value, such as the shared secret value, prior to incorporating the, the now modified, unique card-stored parameter value in the computation of the MAC. The system may further be configured to encrypt, by the applet on the OTP authentication card (e.g., contactless card with a NFC tag storing user identification data in a Near Field Communication Data Exchange Format (NDEF)), the MAC-appended data packet using a second unique session key generated by the applet, to provide a modified OTP authentication cryptogram.

Once the cryptogram is generated by the OTP card, a cryptogram transmission message, comprising the modified OTP cryptogram and one or more data generated at run-time by the OTP authentication card (e.g., ATC value) may be transmitted to a verification server. The verification server may separately store one or more encryption parameter and identifier data used by the OTP card encryption process to generate the cryptogram. Using the stored information (e.g., master encryption keys, shared secret value, user PIN and/or the challenge response) and transmission data included in the cryptogram transmission message along with the OTP authentication cryptogram, the validation server can decrypt the received OTP authentication cryptogram to extract the data packet and the modified MAC. The modified MAC may then be validated using the first unique session key and an identifier, from the plurality of identifiers, corresponding to the user-provided response value.

Some embodiments of the present disclosure are directed to a non-transitory computer-readable medium comprising instructions for execution by a computer hardware arrangement comprising an OTP authentication card with an integrated near field communication (NFC) tag communicatively coupled with an authentication application having one or more components running on a transceiver device associated with a user, and one or more components running on a verification server. Upon execution of the instructions the computer hardware arrange is configured to perform procedures comprising: inserting, by the authentication application, a challenge signing instruction into a first near field communication (NFC) transmittable message, the challenge signing instruction being operative to prompt the transceiver device for a user-provided challenge response value, wherein the first NFC transmittable message corresponds to a write instruction for writing the user-provided challenge response value to the OTP authentication card. Upon receiving the user-provided challenge response value, the authentication application may proceed with transmitting the first NFC transmittable message along with the user-provided challenge response value, to an applet on the OTP authentication card. Upon receiving the transmitted data, the applet may proceed with combining, using a diversification function, the user-provided response value with a first unique session key, to generate a modified Message Authentication Code (MAC), the modified MAC being appended to a data packet to generate a modified data packet. Upon receiving a NFC read instruction, the applet may proceed with encrypting the modified data packet using a second unique session key, to generate a modified OTP authentication cryptogram, the modified OTP authentication cryptogram being transmitted to a verification server, wherein the verification server stores a plurality of identifiers comprising the user-provided response value. Upon receiving the transmitted information, the verification server may proceed with decrypting the modified OTP authentication cryptogram, to extract the modified data packet comprising the data packet and the modified MAC, and validating the modified MAC using the first unique session key and an identifier, from the plurality of identifiers, corresponding to the user-provided response value.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Furthermore, the described features of the embodiments may be combined in any suitable manner. A person of ordinary skill in the art will recognize that the embodiments may be practiced without one or more of the specific features of an embodiment. In other instances, additional features may be recognized in certain embodiments that may not be present in all embodiments. A person of ordinary skill in the art will understand that the described features of any embodiment can be interchangeably combined with the features of any other embodiment.

Figure 1:
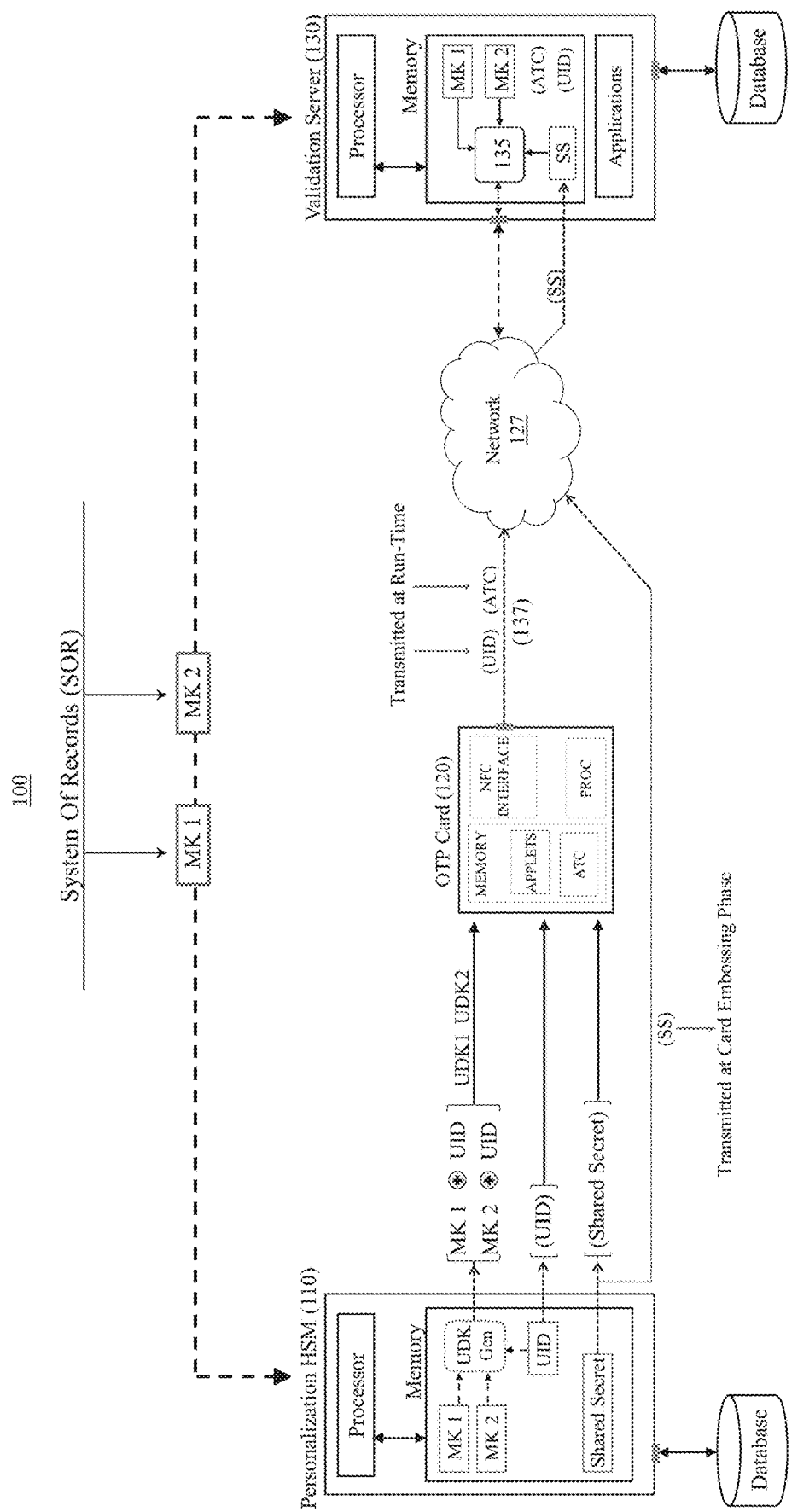
FIG. 1 illustrates a general overview of OTP card configuration and run-time operation associated with the generation and validation of an OTP card cryptogram using static card-stored and dynamic card-generated data.

FIG. 1 illustrates an overview of an OTP card configuration and/or personalization and run-time operation involving transmission of a cryptogram message to a validation server and/or process 130. As shown in example 100, the OTP card configuration and/or personalization process may involve the generation and storing of one or more embossing records onto the OTP authentication card 120. The master cryptographic keys, used for generation of one or more embossing records may be distributed by for example a system of records (SOR) to the card manufacturing and/or personalization as well as a validation entity if separate than the card manufacturer. The card-stored (embossing) data may correspond to a set of unique derived card keys (UDK1, UDK2), a globally unique card identifier (UID) and a shared secret value generated, for example, during the card embossing phase by a card personalization HSM (110. The shared secret value may also be shared with a back-end validation process and/or server 130. In situations whereby a validation server is associated with a third-party validation HSM, the (shared) secret value may be communicated to the third-party validation HSM across a network 127.

Referring back to FIG. 1, the run-time operation of the OTP card may involve generation and transmission of a cryptogram message, that may further include run-time card data (e.g., ATC value) and a globally unique identifier (UID) associated with the OTP card 120, to a validation server and/or process 130. validation of the OTP authentication cryptogram (e.g., cryptogram 210 illustrated in FIG. 2) may be performed, for example, by a MAC validation process 135 stored on the validation server using the stored master keys (MK1, MK2) and the shared secret value (SS), along with card-data received via the cryptogram transmission message 137. The card-stored data transmitted at run-time may, for example, correspond to the latest ATC value recorded by the OTP card 120 and the globally unique card identifier (UID). The run-time operation may be initiated, for example, by performing an OTP card read operation (e.g., by a reader of a mobile device using an NDEF protocol). The process flow for the generation of the OTP authentication cryptogram, as described above, is further illustrated in FIG. 2.

Figure 2:
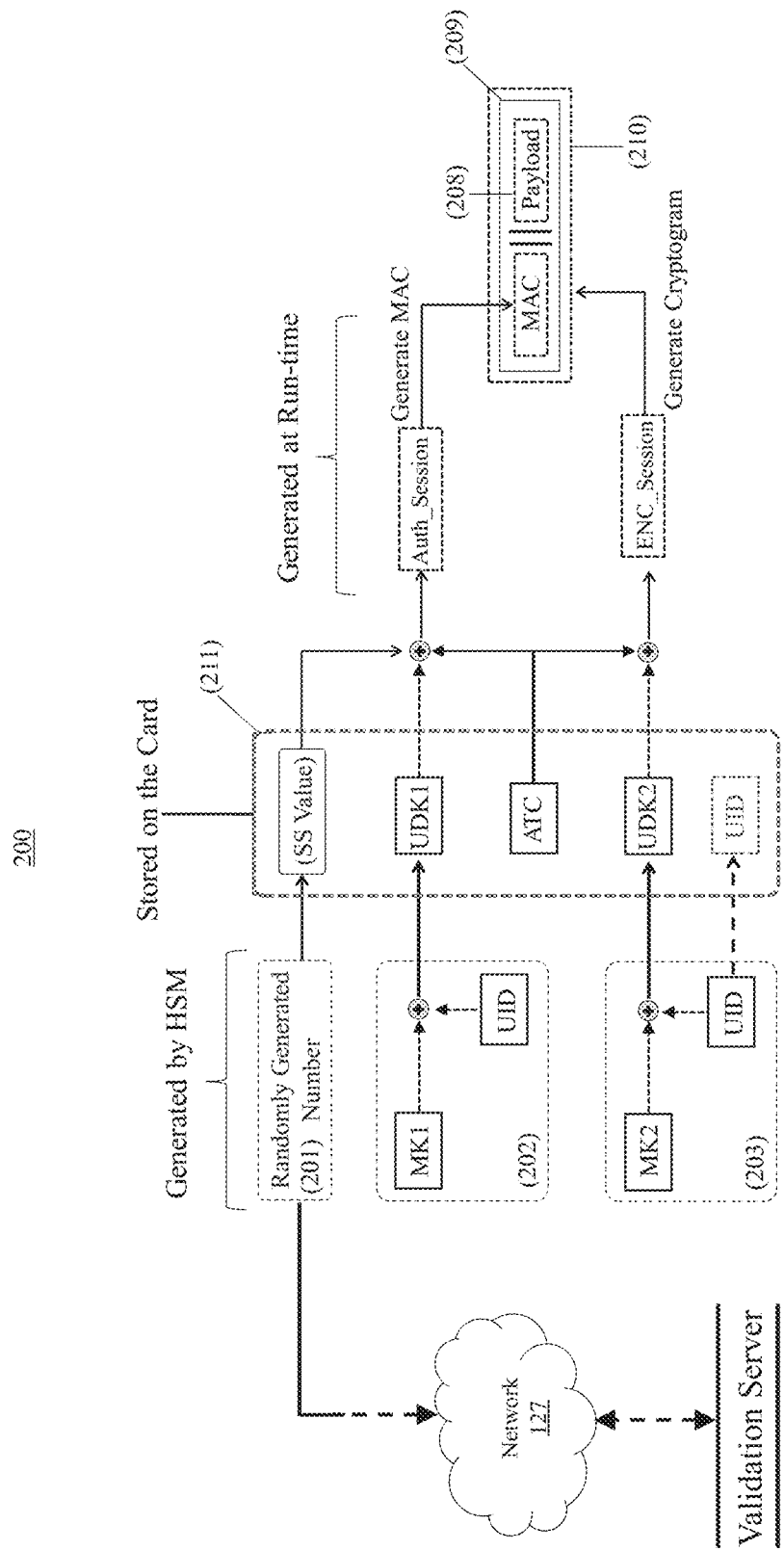
FIG. 2 illustrates a security drawback involving OTP card functionality in providing a single factor authentication as a function of static card-stored and dynamic card-generated data internally stored on the OTP card.

FIG. 2 illustrates a process flow associated with generation of an OTP cryptogram (e.g., cryptogram 210 using static card-stored data such as UDK1, UDK2, UID and the shared secret (SS) value, that may be generated and stored onto the OTP authentication card during the embossing phase operations 201, 202 and 203, as well as dynamic card-stored data, such as the Application Transaction Counter (ATC) value, that may be generated by the OTP authentication card at run-time. The aforementioned static and dynamic card-stored data are used in generation of a first and a second unique session keys, respectively used for generation of the Message Authentication Code (MAC) and encryption of a data packet 209 created by concatenating the MAC with a data payload 208. As illustrated in FIG. 2, the OTP authentication cryptogram 210, generated a function of static and dynamic card-stored data 211 (e.g., data internally stored on the OTP authentication card) provides a single factor authentication based on card-specific data.

Figure 3:
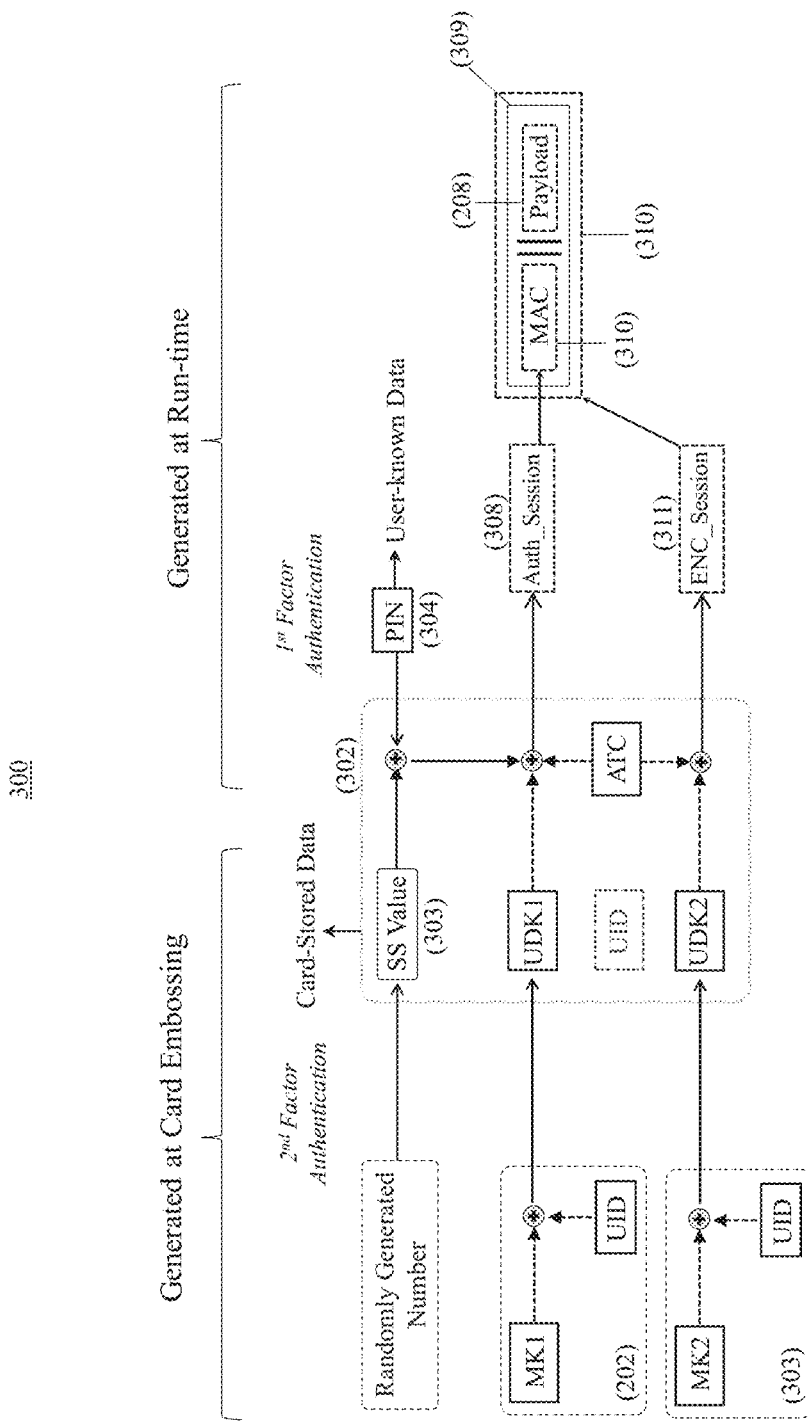
FIG. 3 illustrates an exemplary process flow diagram for generation of a two-factor strong OTP authentication cryptogram as a function of internally stored card data and externally provided user input, in accordance to some embodiments of the present disclosure.

As described above with reference to FIGS. 1 an 2, a cryptogram generation process, provided as a function of OTP card-stored data may amount to a single-factor authentication associated only with identification of a specific OTP card as the source of an OTP authentication transaction and not a user initiating the OTP transaction. However, FIG. 3 illustrates an exemplary process flow, associated with OTP authentication cryptogram generation process 300 involving insertion of a user-known data value (e.g. PIN 304 into the computation of a first unique session key 308 used in the run time generation of the MAC associated with OTP authentication cryptogram, to thereby facilitate a two-factor strong authentication, provided as a function of internally stored card data and externally provided user input.

As such, in accordance to the exemplary implementation 300, the externally provided run-time data, corresponding, for example, to a user PIN 304, may be used, in conjunction with the internally stored card data 302 to generate a modified MAC 310. The modified MAC may then be appended to a data packet to generate a modified data packet 309. The modified data packet 309 may then be encrypted by a second unique session key 311 to generate an OTP authentication cryptogram 310 with two factors of authentication strength, provided as a function of internally stored card data 302 and externally provided user input 304. According to some embodiments, the modified data packet may correspond to a 16 bytes data packet.

In accordance to some embodiment, an externally acquired run-time encryption input such as user PIN 304, used in computation the modified MAC, may not be transmitted in the OTP cryptogram transmission message and instead separately stored by a back-end validation process. In some embodiments the user-provided PIN may be temporarily cached by the authentication application (e.g., one or more components of the authentication application running on a user transceiver device) until a verification response is received from a verification server. The PIN may also be cached by the applet running on the OTP authentication card until a verification response, corresponding to validation of the OTP authentication cryptogram, is received from a back-end validation process and/or a remote verification server.

Figure 4A:
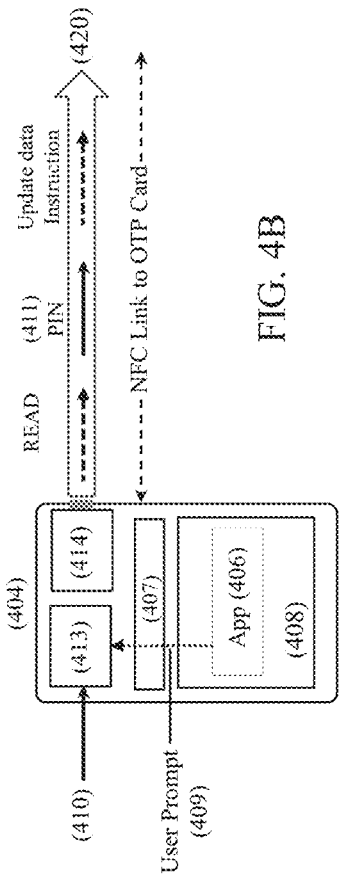
FIGS. 4A-4C illustrates various exemplary embodiments involving a set of command sequences issued to the OTP card at run-time which incorporate writing of an externally-provided data record in the computation of the OTP authentication cryptogram, in accordance to some embodiments of the present disclosure.
Figure 4B:
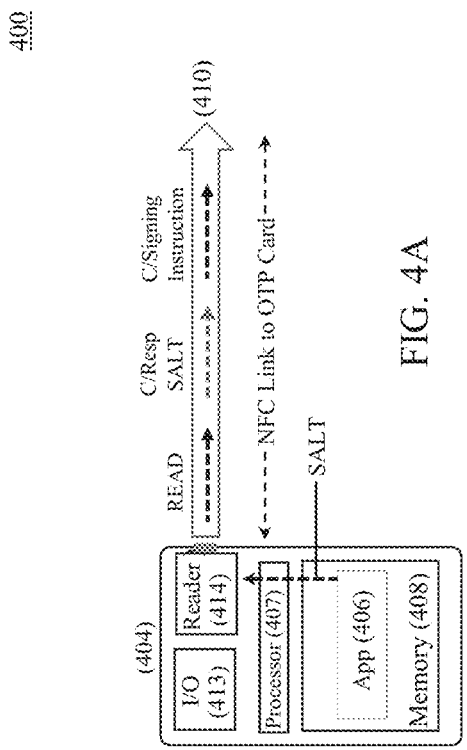
Figure 4C:
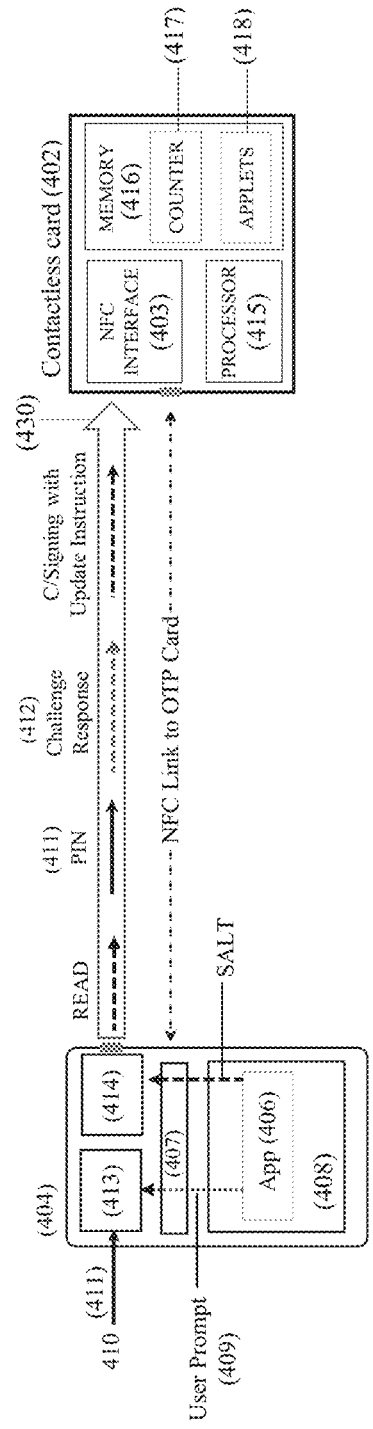

FIGS. 4A-4C illustrate exemplary sets of command sequence and transmission data paths for enabling acquisition of an external data record in computation of a OTP authentication cryptogram by a OTP authentication card. The provided examples correspond to a set of NDEF command sequences that may be issued, at run-time, to an applet running on the OTP authentication card to facilitate writing of an externally-provided data record in the computation of an OTP authentication cryptogram with two factors of authentication strength. For example, according to example in FIG. 4A, the external data acquired at run-time for scrambling the shared secret value, corresponds to a challenge response and/or SALT value provided along with a challenge signing instruction which may precede a Read instruction in the exemplary command sequence 410.

With respect to FIG. 4B, the external data acquired at run-time for scrambling the shared secret value, may be provided based on a user prompt message 409 for a user input 410 corresponding to a PIN 411 which may be inputted into user mobile device 404 at run-time. The acquisition of a user-provided input value (e.g., a PIN and/or password) and a write and/or update command for writing the user-provided input value into the cryptographic MAC generation process, may precede a Read command in the exemplary command sequence 420 associated with FIG. 4B.

The user-provided PIN 411 may not be stored on the OTP authentication card, but directly used in computation of the MAC. This may be implemented, for example, by scrambling the card-stored shared secret value with the user provided PIN, prior to including the (now PIN-encrypted) shared secret value in the MAC computation routine. The aforementioned configuration facilitates the creation of a cryptogram associated with a two factor strong authentication data which incorporated both OTP card-specific information (verification of something the user may have) and dynamic user-inputted information (e.g., the PIN, which provides verification of something the user may know).

FIG. 4C illustrates an exemplary hybrid implementation associated with an exemplary command sequence 430. The exemplary command sequence 430 corresponds to two rounds of diversification and/or encryption of a card-stored data value (e.g., shared secret value), once with a system generated data value (e.g., challenge response 412 and again with a run time user-provided PIN 411. Thus with respect to FIG. 4C, the external data acquired at run-time for scrambling the shared secret value, is provided both by a system application in form of a challenge response and a dynamically transmitted PIN number inputted, for example, by a user conducting an OTP authentication transaction. As such the (modified) MAC may be twice scrambled at runtime prior to being read, for example by the READ command in the command sequence 430. In some embodiments, a diversification operation may correspond to one or more mathematical operations performed on one or more data values to scramble and/or encrypt one data value, using another data value. For example a diversification operation may correspond to performing a logical exclusive OR operation (XOR) between two distinct data values, in order to diversify/scramble one data value using the other data value.

In accordance to some embodiments, one or more of the read command sequences 410, 420 and 430 may be generated by an authentication application 406. The authentication application 406 may have one or more components stored on a user mobile device 404 and one or more components stored on a remote verification server. The read command sequences 410, 420 and 430 illustrated in FIGS. 4A-4C may correspond to modified read commands supplemented with an addition of one or more write commands inserted in the corresponding command sequence prior to the execution of the read. As such a read command sequence with a write value of zero (e.g., challenge value of zero) may corresponds to a read only instruction.

In some embodiments, the OTP authentication card may correspond to a uniquely configured contactless card 402 with an integrated Near Field Communication (NFC) tag 403 storing NFC transmittable user authentication data (readable, for example, by a mobile device 404 running a corresponding application 406. The exemplary contactless card 402 may comprise an integrated processor 415 (e.g., one or more microprocessors) and memory 416 (e.g., RAM, ROM, and EEPROM) that may store, for example, user identifying and/or authenticating information as near field communication (NFC) transmittable data (e.g., NFC Data Exchange Format (NDEF)). The integrated memory 416 may store one or more applets 417 that may be communicatively coupled to one or more applications (e.g. application 406 running on the user mobile and/or computing device 404 and/or one or more applications stored on a corresponding application server (e.g., validation server 130. The card-integrated memory 416 may also store an application transaction counter 418 to keep track of a proper sequence of operations associated with transactions conducted using the contactless card 402. The contactless card 402 may further comprise a Near Field Communication (NFC) interface 403 to facilitate NFC communication with an NFC reader (e.g., reader component 414 of the mobile device 404. The card-stored user authentication information may then be directly captured by a reader component 414 of the mobile user device 404 by bringing the contactless card 402 within an NFC range of the mobile device 404 (e.g., by tapping the contactless card on a reader of the user mobile device) to initiate a direct read, processing, and subsequent validation of user authentication information stored, as NFC transmittable data, on the contactless card.

The user mobile device 404 may include a processor 407, a memory 408, and one or more applications 406. The processor 407 may be a processor, a microprocessor, or other processor, and the user device 404 may include one or more of these processors. The processor 407 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein The processor 407 may be coupled to the memory 408. The memory 408 may be a read-only memory, write-once read-multiple memory or read/write memory, e.g., RAM, ROM, and EEPROM, and the user mobile device 404 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 408 may be configured to store one or more software applications, such as applications 406, and other data, such as user's private data and financial account information. Applications 406 may comprise for example, a web browser with one or more browser extensions, a navigation or Global Positioning System (GPS) application and one or more banking and/or data collection applications with one or more Application Programming Interface (API) components. User (mobile) device 404 may further include one or more Input/Output (I/O) devices 413 for capturing user inputs and displaying one or more information records and/or notification messages to the user. For example, I/O devices 413 may include at least one display and input device. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user mobile device 404 that is available and supported by the device, such as a touch-screen, keyboard, mouse, cursor-control device, touch-screen, microphone, digital camera, video recorder or camcorder. These devices may be used to enter information and interact with the contactless card 402 as described herein.

I/O devices 413, associated with the user device 404, may further include an electronic reader 414 for capturing information via one or more short range communications protocols such as Near Filed Communication (NFC). The user mobile device 404 may be configured to transmit one or more user-related data to the contactless card 402. The user-related data may correspond to one or more user-specified instructions and data parameters, information already stored on the mobile device, and/or real-time captured user inputs, solicited, for example, in response to an actionable notification, such as the user PIN 304.

The user device (e.g., mobile device 404 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other network-enabled computing or communications devices. For example, network-enabled computing devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. It is further understood that the user (mobile) device may be of any type of device that supports the communication and display of data and user input.

The applications 406 may comprise one or more software applications, such as a mobile application and/or a web browser, comprising instructions for execution on the user device 404. In some examples, the user device 404 may execute one or more applications, such as software applications, that enable, for example, network communications with the contactless card 402 and/or the validation server 130, transmit and/or receive data, and perform the functions described herein. Upon execution by the processor 407, one or more applications from applications 406 may provide the functions described in this specification, specifically to execute and perform the steps and functions in the process flows described herein. Such processes may be implemented in software, such as software modules, for execution by computers or other machines. The one or more application may further provide graphical user interfaces (GUIs) through which a user may view and interact with the contactless card 402 and/or the validation server 130. The GUIs may be formatted, for example, as web pages in HyperText Markup Language (HTML), Extensible Markup Language (XML) or in any other suitable form for presentation on a display device depending upon applications used by users to interact with the contactless card 402 and/or the validation server 130.

Figure 5:
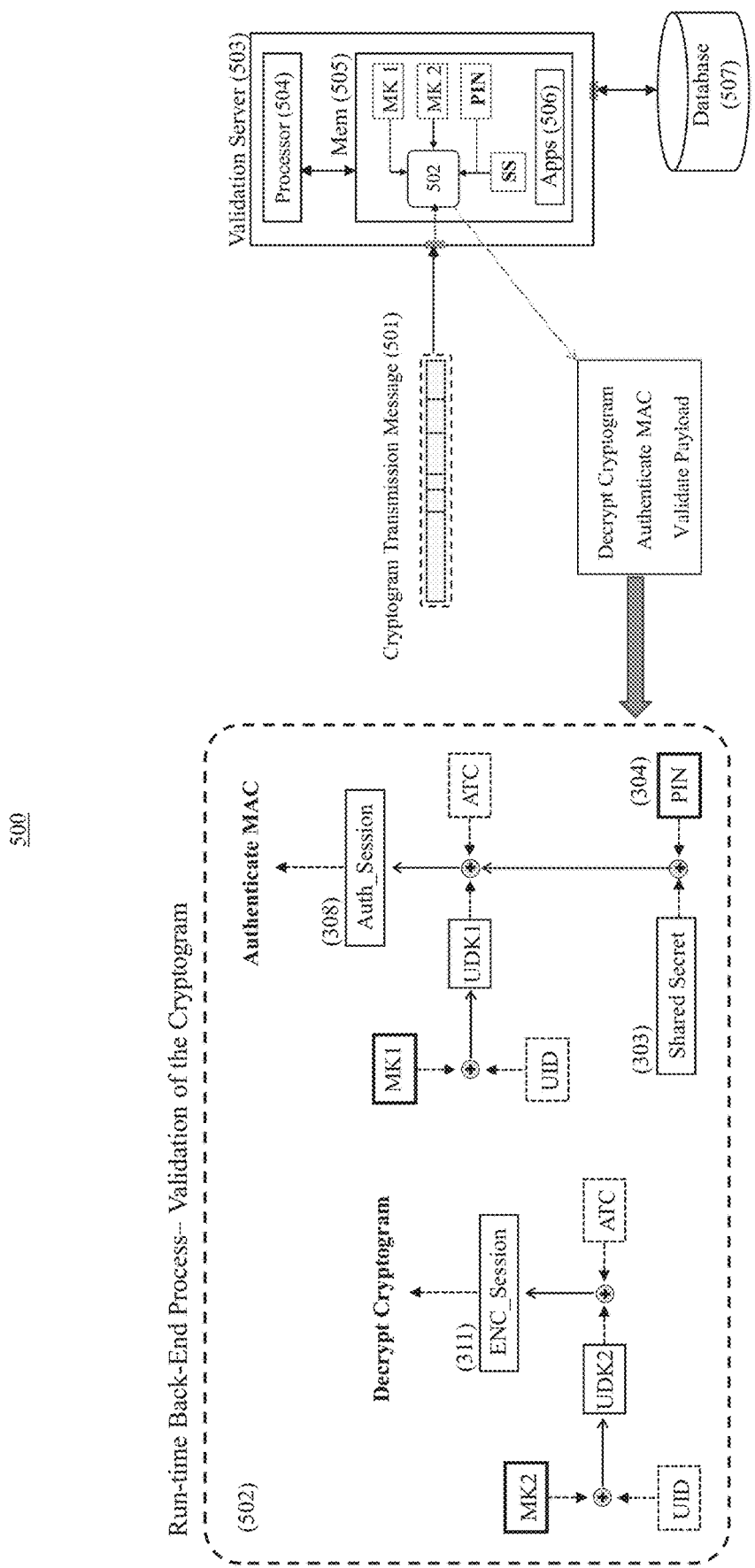
FIG. 5 illustrates an exemplary flow diagram of the OTP authentication cryptogram decryption and validation process, in accordance to some embodiments of the present disclosure.

An exemplary process flow 500 for decryption of a two-factor strong OTP authentication cryptogram, generated by the contactless card 402, is illustrated in FIG. 5. With reference to FIG. 5, an incoming cryptogram 501 may be processed by a validation process 502, running on validation server 503. Process 502 may utilize the stored validation data corresponding to master keys (MK1, MK2), the shared secret (SS) value and a user PIN value corresponding to a user of a specific OTP authentication card, such as contactless card 402. An exemplary run-time validation process flow 502 associated with the validation sever 503 is further illustrated in FIG. 5

The process flow diagram 502, illustrates an exemplary scheme of applying the stored master keys MK1, MK2, the stored shared secret value and the stored data associated with the user PIN, in conjunction with the information included in the OTP cryptogram transmission message 501 (e.g., UID and most recent ATC value that may be required in deriving the encryption session key 311 to decrypt an OTP authentication cryptogram, transmitted in the cryptogram transmission message 501). Once OTP authentication cryptogram is decrypted using the encryption session key 311, an authentication session key 308 may be computed using the stored validation data a transmitted ATC value.

As shown in FIG. 5, the encryption session key 311 may be generated, by the run-time validation process 502, by cryptographically combining the transmitted ATC value with UDK2 (derived by encrypting the transmitted UID with the stored MK2). Similarly, the authentication session key 308 may be generated by cryptographically combining the transmitted ATC value with UDK1 (derived by encrypting the transmitted UID with the stored MK1), a PIN 304 and a shared secret value 303 stored on the verification server and/or a data storage communicatively coupled thereto. Therefore, as shown by the run-time validation process flow 502, an additional layer of encryption/decryption security may be implemented by cryptographic combination of UDK1 with a PIN-scrambled shared secret value.

In accordance to some embodiments, the validation server 503 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or any other network-enabled computing and/or communication device.

Validation server 503 may include a processor 504, a memory 505, and one or more applications 506. The processor 504 may be a processor, a microprocessor, or other processor, and the validation server 503 may include one or more of these processors. The processor 504 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 504 may be coupled to the memory 505. The memory 505 may be a read-only memory, write-once read-multiple memory or read/write memory, e.g., RAM, ROM, and EEPROM, and the validation server 503 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 505 may be configured to store one or more software applications, such as the applications 506, and other data, such as user's private identification data and financial account information.

The applications 506 may comprise one or more software applications comprising instructions for execution on the validation server 503. In some examples, the validation server 503 may execute one or more applications, such as software applications, that enable, for example, network communications with the mobile device 404 and/or the contactless card 402, transmit and/or receive data, and perform the functions described herein. Upon execution by the processor 504, the applications 506 may provide the functions described in this specification, specifically to execute and perform the steps and functions in the process flows associated with process 502. For example, the applications 506 may comprise one or more data collection applications, having one or more Application Programming Interface (API) components, to facilitate, upon execution, one or more data collection operations for the retrieval of data values from the mobile device 404, contactless card 402 and/or database 507.

The database 507 may be one or more databases configured to store data, including without limitation, one or more user identifying and/or financial accounts information and one or more merchant-specific transaction histories. The database 507 may comprise a relational database, a non-relational database, or other database implementations, and any combination thereof, including a plurality of relational databases and non-relational databases. In some examples, the database 507 may comprise a desktop database, a mobile database, or an in-memory database. Further, the database 507 may be hosted internally by the validations server 503 or may be hosted externally of the validation server 503, such as by a server, by a cloud-based platform, or in any storage device that is in data communication with the validation server 503. Database 507 may further store processed user information (e.g., relating to user transactional behavior and purchasing patterns) compiled and computed by the validation server 503 and/or user computing and/or mobile device 404.

Figure 6:
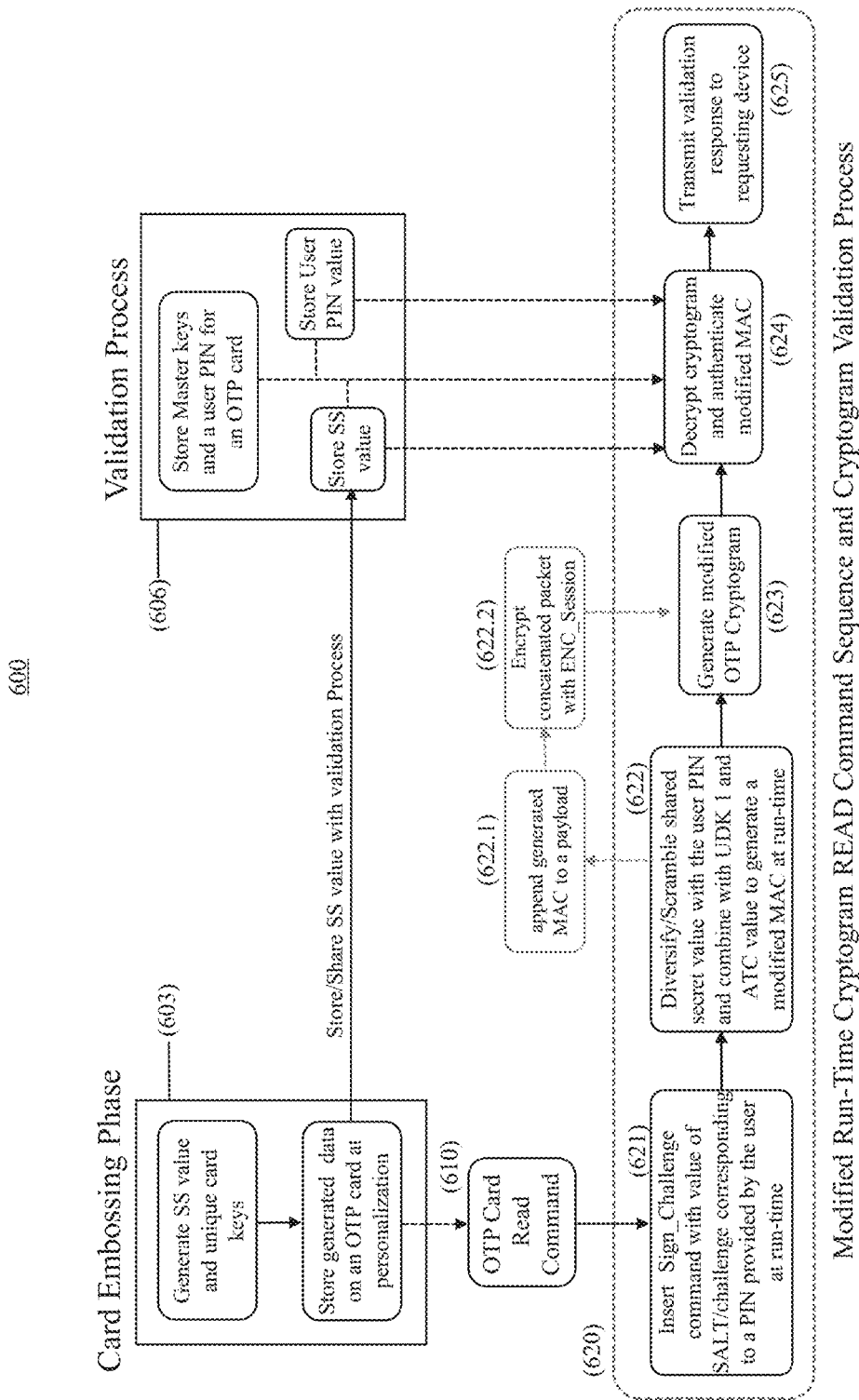
FIG. 6 provides a flow chart of a OTP card run-time operation sequence based on a modified NDEF read process comprising a pre-read write operation for writing an external user-provided value into the computation of the OTP card cryptogram, in accordance to some embodiment of the present disclosure.

FIG. 6 provides a flow chart 600 illustrating an exemplary OTP card run-time operation sequence 620 based on a modified NDEF read process (generated for example at step 610). The run-time operation sequence 620 comprises a pre-read write operation 621 for inserting an external user-provided data value into the computation of the OTP authentication cryptogram. The user maybe prompted to enter a PIN upon initiating an NFC read of the OTP authentication card (e.g., to authenticate an online electronic transaction). The write operation may also involve inserting a challenge response and/or SALT value, which may be transmitted to the OTP card at run-time.

Referring back to exemplary implementation 600, step 603 illustrates a personalization phase of an OTP card for generation and storage of one or more embossing records, relevant to the configuration and run-time operation (e.g., cryptogram generation) of an OTP authentication card. The one or more embossing records stored on the OTP authentication card (e.g., unique card keys, SS value, card UID) may be required, in conjunction with one or more input data values generated and/or provided at run time, for generation of the OTP authentication cryptogram. Similarly, as shown by step 606, the relevant data, needed for validation of the OTP authentication cryptogram may also be stored with a back-end validation process. The validation data may comprise unique card keys, and the shared secret value, as well as one or more pre-specified data values corresponding to dynamically generated (card-external) run time data that may be used in generation of the OTP authentication cryptogram. In some embodiments associated with a third-party validation entity, the relevant cryptogram validation data may be stored on a corresponding validation HSM.

With reference to FIG. 6, an OTP card personalization phase 603 may involve the generation and storage of embossing records (e.g., shared secret value, UDK 1, UDK 2 and UID) onto an integrated memory of an OTP authentication card. As shown by the flow diagram 600, the role of a validation entity, comprising storage of the master keys as part of a cryptogram validation function (step 606) may also be implemented by a back-end validation process for enabling the sequence of run-time operations 620. The run-time OTP card operation sequence 620 comprises generation of the (modified) OTP authentication cryptogram (steps 621, 622, 623) and transmission and validation of the modified OTP authentication cryptogram (step 624 and 625).

The generation of the modified MAC at step 622, and the generation of the modified OTP authentication cryptogram at step 623, may be interceded by step 622.1 corresponding to concatenation of the generated modified MAC with a data payload, and step 622.2 corresponding to the encryption of the resulting (modified) data packet with a session encryption key. The session encryption key may be generated by diversifying a unique card key (UDK2) stored on the OTP authentication card with a run-time generated ATC value. In some embodiments, the data payload may correspond to a randomly generated 8 byte number.

As indicated above, with respect to example 600, the run-time OTP card operation sequence 620 may further comprise validation of the OTP cryptogram as illustrated by step 624. The validation process may comprise a (server-side) computation of the encryption and authentication session keys (e.g. process flow 502 in FIG. 5) in order to extract and authenticate the modified MAC and validate modified OTP authentication cryptogram. After successful validation of the modified OTP authentication cryptogram, a validation response may be transmitted back to a requesting source at step 625. The requesting source may correspond, for example, to the transceiver device (e.g., user mobile device) initiating a read of the OTP authentication card.

In some embodiments, the Pre-Read write operation may involve a challenge signing command, issued at run-time, with a challenge response and or SALT value included in the command sequence and transmitted to the OTP authentication card at run-time. The challenge response value may then be utilized by a relevant card-stored applet to diversify and/or scramble one or more card-stored data values (e.g., the shared secret value, stored onto the OTP authentication card during card embossing phase 603). The scrambled data value may then be combined with other card-stored data parameters, such as UDK1, and run-time generated card-data, such as the ATC value, to generate the MAC. The MAC may then be appended to a data payload and encrypted with an encryption session key to generate the cryptogram.

Figure 7:
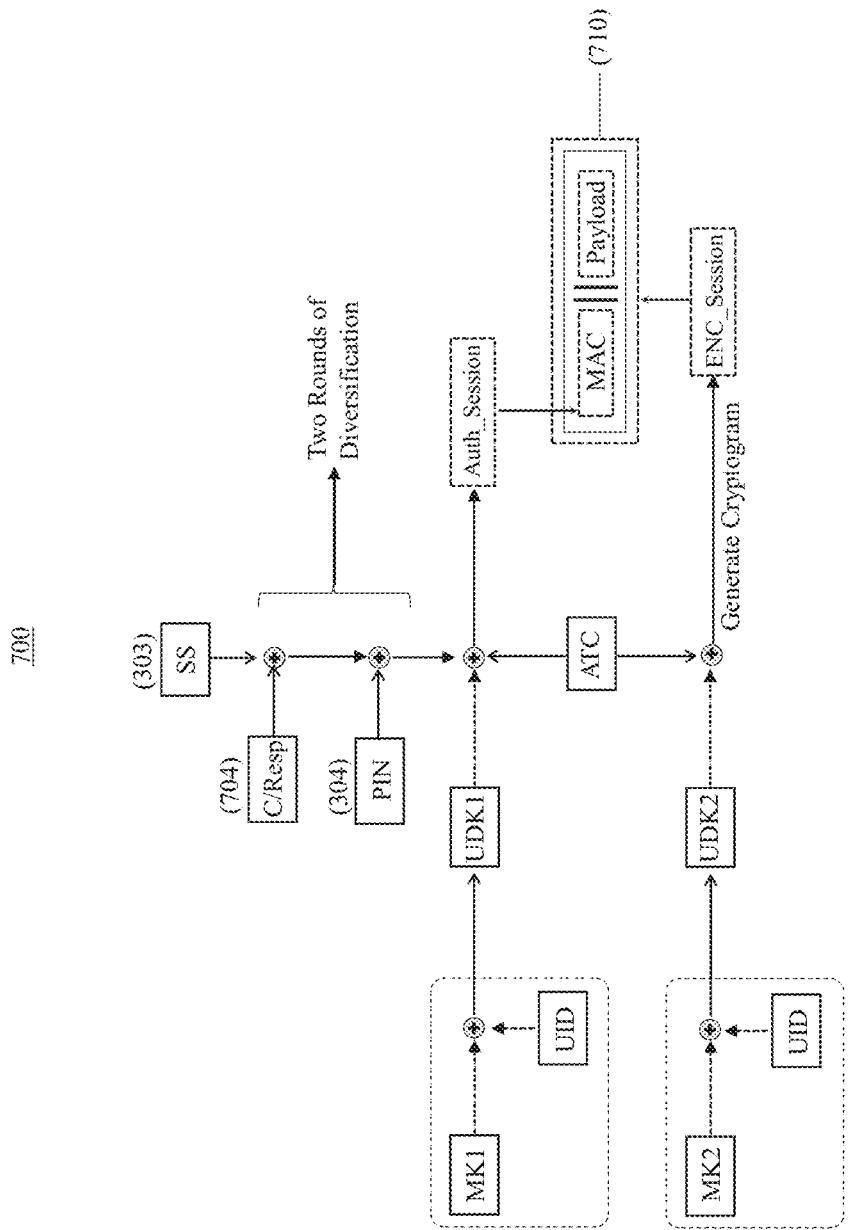
FIG. 7 provides an exemplary implementation of the OTP card encryption process involving two rounds of diversification with distinct data values corresponding to a system/application provided challenge response value and a run-time user inputted PIN value, in accordance to some embodiments of the present disclosure.

FIG. 7 illustrates an exemplary implementation of an OTP authentication card run-time encryption process 700 involving two rounds of diversification with distinct data values. The two rounds of diversification as shown in FIG. 7, may correspond to scrambling and/or diversifying a card-stored data value (e.g., shared secret value 303) with two distinct external data values. In the exemplary implementation 700, the two distinct data values correspond to a system generated challenge response and/or SALT value 704, that may be provided in a pre-READ write and/or update instruction, and a user-provided PIN 304 that may be inputted by a user of the OTP card. As described above, such externally provided run-time data (e.g., challenge response and/or a user PIN) that may be used in generation of a OTP authentication cryptogram 710, may not be included in the OTP cryptogram transmission message, which includes, for example, the cryptogram 710 and one or more card-stored data such as the UID and the ATC value. As such, in addition to card-stored data, the exemplary process 700 may further incorporate, a system generated data value 704 as well as a user-provided data value 705 into the encryption process for computation of OTP authentication cryptogram, to further improve security performance of OTP card authentication process. In some embodiments the relevant data used in the generation of the cryptogram (e.g., shared secret value, challenge response, user PIN) may be separately stored by a back-end validation process and/or entity and used in conjunction with the stored master keys (MK1 and MK2) and the OTP transmission data (e.g., UID, ATC) to decrypt the OTP message and validate the MAC.

Figure 8:
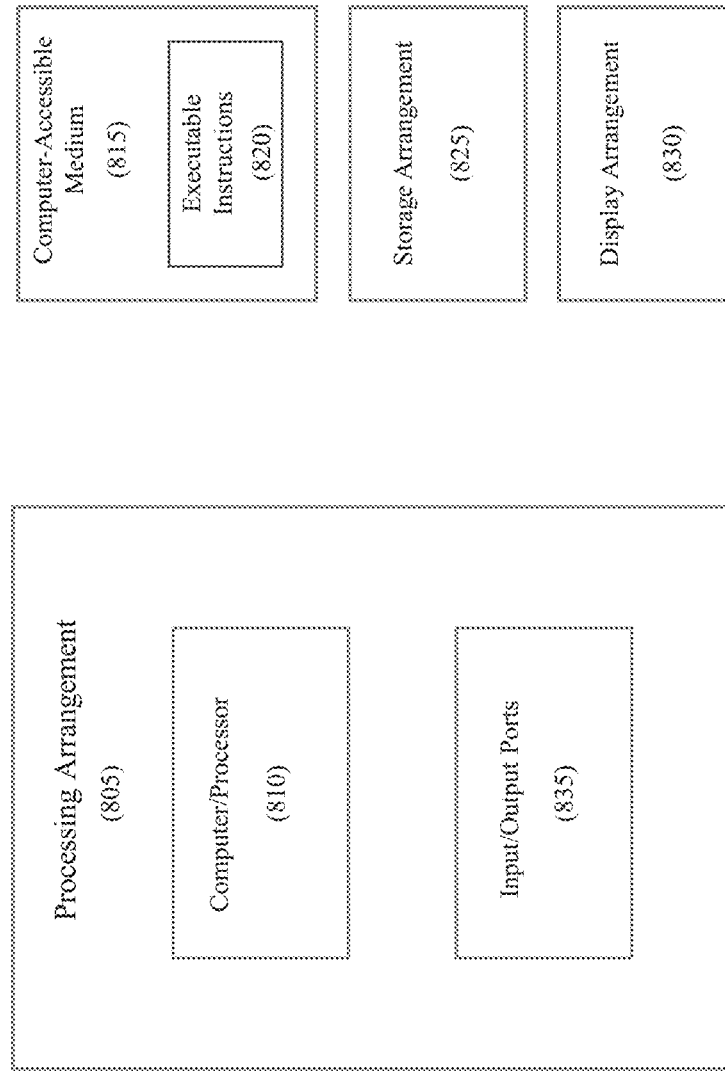
FIG. 8 is an illustration of an exemplary block diagram of an exemplary system, in accordance to some embodiments of the present disclosure.

FIG. 8 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 805. Such processing and/or computing arrangement 805 can be, for example entirely or a part of, or include, but not limited to, a computer and/or processor 810 that can include, for example one or more microprocessors, and use instructions stored on a computer-accessible medium (e.g., RAM, ROM, hard drive, or other storage device).

As shown in FIG. 8, for example a computer-accessible medium 815 (e.g., as described herein above, a storage device such as a hard disk, floppy disk, memory stick, CD-ROM, RAM, ROM, etc., or a collection thereof) can be provided (e.g., in communication with the processing arrangement 805). The computer-accessible medium 815 can contain executable instructions 820 thereon. In addition or alternatively, a storage arrangement 825 can be provided separately from the computer-accessible medium 815, which can provide the instructions to the processing arrangement 805 so as to configure the processing arrangement to execute the exemplary procedures, processes, and methods, as described herein above, for example.

Further, the exemplary processing arrangement 805 can be provided with or include an input and/or output ports 835, which can include, for example a wired network, a wireless network, the internet, an intranet, a data collection probe, a sensor, etc. As shown in FIG. 8, the exemplary processing arrangement 805 can be in communication with an exemplary display arrangement 830, which, according to certain exemplary embodiments of the present disclosure, can be a touch-screen configured for inputting information to the processing arrangement in addition to outputting information from the processing arrangement, for example. Further, the exemplary display arrangement 830 and/or a storage arrangement 825 can be used to display and/or store data in a user-accessible format and/or user-readable format.

In some aspects, the techniques described herein relate to a method for improving operational security associated with OTP authentication cards, the method including: inserting, by an authentication application, a challenge signing instruction into a first near field communication (NFC) transmittable message, the challenge signing instruction being operative to prompt for a user-provided challenge response value, and the first NFC transmittable message corresponding to a write instruction for writing the user-provided challenge response value to an OTP authentication card; transmitting, by the authentication application, the first NFC transmittable message along with the user-provided challenge response value, to an applet running on an OTP authentication card with an integrated NFC tag; combining, using a diversification function, the user-provided response value with a first unique session key, to generate a modified Message Authentication Code (MAC), the modified MAC being appended to a data packet to generated a modified data packet; encrypting the modified data packet using a second unique session key, to generate an OTP authentication cryptogram, the OTP authentication cryptogram being transmitted to a verification server, wherein the verification server stores a plurality of identifiers including the user-provided response value; decrypting by the verification server, the OTP authentication cryptogram, to extract the modified data packet including the data packet and the modified MAC; and validating, by the verification server, the modified MAC using the first unique session key and an identifier, from the plurality of identifiers, corresponding to the user-provided response value.

In some aspects, the techniques described herein relate to a method, wherein the OTP authentication cryptogram is generated upon receiving a second NFC transmittable message corresponding to a read instruction for retrieving the OTP authentication cryptogram from the OTP authentication card.

In some aspects, the techniques described herein relate to a method, wherein the user-provided challenge response value corresponds to a Personal Identification Number (PIN), inputted into a transceiver device associated with the user.

In some aspects, the techniques described herein relate to a method, wherein the PIN is cached, by one or more components of the authentication application running on the transceiver device, until a verification message is received from the verification server.

In some aspects, the techniques described herein relate to a method, wherein the PIN is cached by the applet running on the OTP authentication card, until a verification message is received from the verification server.

In some aspects, the techniques described herein relate to a method, wherein the first unique session key is generated by diversifying a corresponding first unique identifier with a shared secret value, stored on the OTP authentication card, and an application transaction counter (ATC) value, generated at run time for a specific OTP authentication transaction.

In some aspects, the techniques described herein relate to a method, wherein the challenge signing instruction further includes a challenge response value, operative to scramble the shared secret value, to thereby generate a modified MAC corresponding to two rounds of encryption.

In some aspects, the techniques described herein relate to a method, wherein the shared secret value is separately generated by the applet stored on the OTP authentication card and the verification server.

In some aspects, the techniques described herein relate to a method, wherein scrambling of the shared secret value with the challenge response value, included in the challenge signing instruction, corresponds to the diversification function used in combining the user-provided response with the first unique session key.

In some aspects, the techniques described herein relate to a method, wherein the diversification function includes performing a logical exclusive OR operation on two or more data values being combined.

In some aspects, the techniques described herein relate to a method, wherein the second NFC transmittable message and the first NFC transmittable message are combined into a modified read command incorporating the challenge-response instruction for writing a challenge response value onto the OTP authentication card, wherein a challenge value of zero corresponds to a read only instruction.

In some aspects, the techniques described herein relate to a method, wherein the plurality of identifiers including the user-provided response value are stored on a database communicatively coupled to the verification server.

In some aspects, the techniques described herein relate to a method, wherein the modified data packet corresponds to a 16 bytes data packet.

In some aspects, the techniques described herein relate to a method, wherein the shared secret value is separately generated by the applet stored on the OTP authentication card and the verification server.

In some aspects, the techniques described herein relate to a method, wherein the authentication cryptogram incorporates two factors of authentication in creation of the modified MAC, by incorporating the user-provided response value and the corresponding first unique identifier, stored on the OTP authentication card, into a computation of the first unique session key used to generate the modified MAC.

In some aspects, the techniques described herein relate to a system for secure authentication of encrypted data, the system including: a computer hardware arrangement including an OTP authentication card with an integrated near field communication (NFC) tag communicatively coupled with an authentication application having one or more components running on a transceiver device associated with a user, and one or more components running on a verification server, the hardware arrangement being configured to: insert, by the authentication application, a challenge signing instruction into a first near field communication (NFC) transmittable message, the challenge signing instruction being operative to prompt for a user-provided challenge response value, wherein the first NFC transmittable message corresponds to a write instruction for writing the user-provided challenge response value onto the OTP authentication card; transmit, by the authentication application, the first NFC transmittable message along with the user-provided challenge response value to an applet running on the OTP authentication card, wherein the user-provided challenge response value is inputted via the transceiver device in response to a user prompt generated by the authentication application; combine, using a first diversification function, the user-provided response value with a first unique session key, to generate a modified Message Authentication Code (MAC), the modified MAC being appended to a data packet to generated a modified data packet; encrypt the modified data packet, using a second unique session key, to generate a two-factor strong OTP authentication cryptogram, the two-factor strong OTP authentication cryptogram being transmitted to the verification server, wherein the verification server stores a plurality of identifiers including the user-provided response value; decrypt, by the verification server, the two-factor strong OTP authentication cryptogram, to extract the modified data packet including the data packet and the modified MAC; and validate, by the verification server, the modified MAC using the first unique session key and an identifier, from the plurality of identifiers, corresponding to the user-provided response value.

In some aspects, the techniques described herein relate to a system, wherein the two-factor strong OTP authentication cryptogram is retrieved from the OTP authentication card using a reader of the transceiver device, and transmitted to the verification server in response to a second NFC transmittable message corresponding to an NFC read instruction.

In some aspects, the techniques described herein relate to a system, wherein the user-provided response value corresponds to one or more of a Personal Identification Number (PIN) and a user password, inputted into the transceiver device by the user.

In some aspects, the techniques described herein relate to a system, wherein the challenge signing instruction further includes a challenge response value, operative to scramble a shared secret value used for generating the modified MAC, to thereby generate a modified MAC corresponding to two rounds of diversification.

In some aspects, the techniques described herein relate to a non-transitory computer-readable medium including instructions for execution by a computer hardware arrangement including an OTP authentication card with an integrated near field communication (NFC) tag communicatively coupled with an authentication application having one or more components running on a transceiver device associated with a user, and one or more components running on a verification server, wherein, upon execution of the instructions the computer hardware arrange is configured to perform procedures including: inserting, by the authentication application, a challenge signing instruction into a first near field communication (NFC) transmittable message, the challenge signing instruction being operative to prompt the transceiver device for a user-provided challenge response value, wherein the first NFC transmittable message corresponds to a write instruction for writing the user-provided challenge response value to the OTP authentication card; transmitting, by the authentication application, the first NFC transmittable message along with the user-provided challenge response value, to an applet on the OTP authentication card; combining, using a diversification function, the user-provided response value with a first unique session key, to generate a modified Message Authentication Code (MAC), the modified MAC being appended to a data packet to generated a modified data packet; encrypting the modified data packet using a second unique session key, to generate a modified OTP authentication cryptogram, the modified OTP authentication cryptogram being transmitted to a verification server, wherein the verification server stores a plurality of identifiers including the user-provided response value; decrypting by the verification server, the modified OTP authentication cryptogram, to extract the modified data packet including the data packet and the modified MAC; and validating the modified MAC using the first unique session key and an identifier, from the plurality of identifiers, corresponding to the user-provided response value.

As used herein, the term "card" is not limited to a particular type of card. Rather, it is understood that the term "card" can refer to a contact-based card, a contactless card, or any other card, unless otherwise indicated. It is further understood that the present disclosure is not limited to cards having a certain purpose (e.g., payment cards, gift cards, identification cards, membership cards, transportation cards, access cards), to cards associated with a particular type of account (e.g., a credit account, a debit account, a membership account), or to cards issued by a particular entity (e.g., a commercial entity, a financial institution, a government entity, a social club). Instead, it is understood that the present disclosure includes cards having any purpose, account association, or issuing entity.

Systems and methods described herein can provide secure, retrieval of sensitive user information or enabling streamlined communication and processing of sensitive user information for example, for facilitating secure electronic transactions. Once a valid authorization response from an authenticated user has been established, the automated data retrieval and transfer system and process can permit, without limitation, financial transactions (e.g., credit card and debit card transactions), account management transactions (e.g., card refresh, card replacement, and new card addition transactions), membership transactions (e.g., joining and departing transactions), point of access transactions (e.g., building access and secure storage access transactions), transportation transactions (e.g., ticketing and boarding transactions), and other transactions.

As used herein, personal identification information (PII) can include any sensitive data, including financial data (e.g., account information, account balances, account activity), personal information and/or personally-identifiable information (e.g., social security number, home or work address, birth date, telephone number, email address, passport number, driver's license number), access information (e.g., passwords, security codes, authorization codes, biometric data), and any other information that user may desire to avoid revealing to unauthorized persons.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A method for improving operational security associated with OTP authentication cards, the method comprising:
inserting, by an authentication application, a challenge signing instruction into a first near field communication (NFC) transmittable message, the challenge signing instruction being operative to prompt for a user-provided challenge response value, and the first NFC transmittable message corresponding to a write instruction for writing the user-provided challenge response value to an OTP authentication card;
transmitting, by the authentication application, the first NFC transmittable message along with the user-provided challenge response value, to an applet running on the OTP authentication card with an integrated NFC tag;
combining, using a diversification function, the user-provided challenge response value with a first unique session key, to generate a modified Message Authentication Code (MAC), the modified MAC being appended to a data packet to generate a modified data packet,
wherein the first unique session key is generated by:
scrambling a shared secret value firstly with a system generated challenge response value and then secondly with the user-provided challenge response value to generate a scrambled shared secret value, and
by cryptographically combining a unique derived card key with an application transaction counter (ATC) value and the scrambled shared secret value, and
wherein the scrambling includes performing a logical exclusive OR operation (XOR) between the shared secret value and the system generated challenge response value and the user-provided challenge response value;
encrypting the modified data packet using a second unique session key, to generate an OTP authentication cryptogram, the OTP authentication cryptogram being transmitted to a verification server, wherein the verification server stores a plurality of identifiers comprising an identifier corresponding to the user-provided challenge response value;
decrypting by the verification server, the OTP authentication cryptogram, to extract the modified data packet comprising the data packet and the modified MAC; and
validating, by the verification server, the modified MAC using the first unique session key and the identifier, from the plurality of identifiers, corresponding to the user-provided challenge response value.

2. The method of claim 1, wherein the OTP authentication cryptogram is generated upon receiving a second NFC transmittable message corresponding to a read instruction for retrieving the OTP authentication cryptogram from the OTP authentication card.

3. The method of claim 1, wherein the user-provided challenge response value corresponds to a Personal Identification Number (PIN), inputted into a transceiver device associated with a user.

4. The method of claim 3, wherein the PIN is cached, by one or more components of the authentication application running on the transceiver device, until a verification message is received from the verification server.

5. The method of claim 3, wherein the PIN is cached by the applet running on the OTP authentication card, until a verification message is received from the verification server.

6. The method of claim 1, wherein the shared secret value is stored on the OTP authentication card, and the ATC value is generated at run time for a specific OTP authentication transaction.

7. The method of claim 6, wherein the challenge signing instruction further comprises the system generated challenge response value, operative to scramble the shared secret value, to thereby generate a modified MAC corresponding to two rounds of encryption.

8. The method of claim 6, wherein the shared secret value is separately generated by the applet stored on the OTP authentication card and the verification server.

9. The method of claim 7, wherein scrambling of the shared secret value with the system generated challenge response value, included in the challenge signing instruction, corresponds to the diversification function used in combining the user-provided challenge response value with the first unique session key.

10. The method of claim 1, wherein the diversification function comprises performing a logical exclusive OR operation on two or more data values being combined.

11. The method of claim 2, wherein the second NFC transmittable message and the first NFC transmittable message are combined into a modified read command incorporating a challenge-response instruction for writing a challenge response value onto the OTP authentication card, wherein a challenge value of zero corresponds to a read-only instruction.

12. The method of claim 1, wherein the plurality of identifiers comprising the user-provided challenge response value are stored on a database communicatively coupled to the verification server.

13. The method of claim 1, wherein the modified data packet corresponds to a 16 bytes data packet.

14. The method of claim 1, wherein the OTP authentication cryptogram incorporates two factors of authentication in creation of the modified MAC, by incorporating the user-provided challenge response value and a corresponding first unique identifier, stored on the OTP authentication card, into a computation of the first unique session key used to generate the modified MAC.

15. A system for secure authentication of encrypted data, the system comprising:
  a computer hardware arrangement comprising an OTP authentication card with an integrated near field communication (NFC) tag communicatively coupled with an authentication application having one or more components running on a transceiver device associated with a user, and one or more components running on a verification server, the computer hardware arrangement being configured to:
  insert, by the authentication application, a challenge signing instruction into a first NFC transmittable message, the challenge signing instruction being operative to prompt for a user-provided challenge response value, wherein the first NFC transmittable message corresponds to a write instruction for writing the user-provided challenge response value onto the OTP authentication card;
  transmit, by the authentication application, the first NFC transmittable message along with the user-provided challenge response value to an applet running on the OTP authentication card, wherein the user-provided challenge response value is inputted via the transceiver device in response to a user prompt generated by the authentication application;
  combine, using a first diversification function, the user-provided challenge response value with a first unique session key, to generate a modified Message Authentication Code (MAC), the modified MAC being appended to a data packet to generate a modified data packet,
    wherein the first unique session key is generated by:
      scrambling a shared secret value firstly with a system generated challenge response value and then secondly with the user-provided challenge response value to generate a scrambled shared secret value, and
      by cryptographically combining a unique derived card key with an application transaction counter (ATC) value and the scrambled shared secret value, and
    wherein the scrambling includes performing a logical exclusive OR operation (XOR) between the shared secret value and the system generated challenge response value and the user-provided challenge response value;
  encrypt the modified data packet, using a second unique session key, to generate a two-factor strong OTP authentication cryptogram, the two-factor strong OTP authentication cryptogram being transmitted to the verification server, wherein the verification server stores a plurality of identifiers comprising the user-provided challenge response value;
  decrypt, by the verification server, the two-factor strong OTP authentication cryptogram, to extract the modified data packet comprising the data packet and the modified MAC; and
  validate, by the verification server, the modified MAC using the first unique session key and an identifier, from the plurality of identifiers, corresponding to the user-provided challenge response value.

16. The system of claim 15, wherein the two-factor strong OTP authentication cryptogram is retrieved from the OTP authentication card using a reader of the transceiver device and transmitted to the verification server in response to a second NFC transmittable message corresponding to an NFC read instruction.

17. The system of claim 15, wherein the user-provided challenge response value corresponds to one or more of a Personal Identification Number (PIN) and a user password, inputted into the transceiver device by the user.

18. The system of claim 15, wherein the challenge signing instruction further comprises the system generated challenge response value, operative to scramble the shared secret value used for generating the modified MAC, to thereby generate a modified MAC corresponding to two rounds of diversification.

19. A non-transitory computer-readable medium comprising instructions for execution by a computer hardware arrangement comprising an OTP authentication card with an integrated near field communication (NFC) tag communicatively coupled with an authentication application having one or more components running on a transceiver device associated with a user, and one or more components running on a verification server, wherein, upon execution of the instructions the computer hardware arrangement is configured to perform procedures comprising:
  inserting, by the authentication application, a challenge signing instruction into a first NFC transmittable message, the challenge signing instruction being operative to prompt the transceiver device for a user-provided challenge response value, wherein the first NFC transmittable message corresponds to a write instruction for writing the user-provided challenge response value to the OTP authentication card;
  transmitting, by the authentication application, the first NFC transmittable message along with the user-provided challenge response value, to an applet on the OTP authentication card;
  combining, using a diversification function, the user-provided challenge response value with a first unique session key, to generate a modified Message Authentication Code (MAC), the modified MAC being appended to a data packet to generate a modified data packet,
    wherein the first unique session key is generated by:
      scrambling a shared secret value firstly with a system generated challenge response value and then secondly with the user-provided challenge response value to generate a scrambled shared secret value, and by cryptographically combining a unique derived card key with an application transaction counter (ATC) value and the scrambled shared secret value, and wherein the scrambling includes performing a logical exclusive OR operation (XOR) between the shared secret value and the system generated challenge response value and the user-provided challenge response value;

encrypting the modified data packet using a second unique session key, to generate a modified OTP authentication cryptogram, the modified OTP authentication cryptogram being transmitted to a verification server, wherein the verification server stores a plurality of identifiers comprising the user-provided challenge response value;

decrypting by the verification server, the modified OTP authentication cryptogram, to extract the modified data packet comprising the data packet and the modified MAC; and validating the modified MAC using the first unique session key and an identifier, from the plurality of identifiers, corresponding to the user-provided challenge response value.

20. The non-transitory computer-readable medium of claim 19, wherein the write instruction is further for writing a SALT value to the OTP transaction card.

* * * * *